350-420 SR Pend 350/321 9/14/76

XR 3,800,085

United States Patent

Ambats et al.

[11] 3,800,085

[45] Mar. 26, 1974

[54] CONVERTIBLE DIRECT VIEWING/PROJECTION T-V SYSTEM

[76] Inventors: Maris Ambats, 480 Broome St.; Thomas D. Shannon, 486 Broadway; Walter Joseph DeMaria, 27 Howard St., all of New York, N.Y. 10013

[22] Filed: Oct. 20, 1972

[21] Appl. No.: 299,197

[52] U.S. Cl. .............. 178/7.91, 178/7.85, 178/7.92, 350/181

[51] Int. Cl. .......................... G02b 13/08, H04n 5/74

[58] Field of Search ......... 178/7.85, 7.92, 7.91, 6.8; 350/181

[56] References Cited

UNITED STATES PATENTS

| | | | |
|---|---|---|---|
| 2,275,229 | 3/1942 | Morch | 178/7.91 |
| 2,287,307 | 6/1942 | Herbst | 178/6.8 |
| 2,489,835 | 11/1949 | Traub | 178/7.92 |
| 2,186,570 | 1/1940 | Batchelor | 178/7.91 |
| 3,658,410 | 4/1972 | Willey | 350/181 |
| 2,260,228 | 10/1941 | Moller | 178/7.92 |
| 2,683,394 | 7/1954 | Polanyi | 178/7.92 |

*Primary Examiner*—Howard W. Britton

[57] ABSTRACT

A converter attachable to a standard television set whereby the set, when the converter is disconnected, may be directly viewed in the usual manner, but when the converter is operating, functions to produce a properly-oriented bright image in an enlarged scale on a remote screen. The converter consists of an optical accessory mountable over the front face of the set and an inverting switch connected to the vertical deflection circuit of the set. The optical accessory includes a housing that masks the face of the cathode ray display tube, the housing containing a high-speed objective. The objective is constituted by a field flattener lens fixedly positioned adjacent the outwardly curved face of the cathode ray tube and serving optically to flatten the curved field on the cathode ray screen, and a movable lens barrel for projecting the flattened image field onto a remote screen. The barrel is axially shiftable relative to the field flattener lens for purpose of focusing the projected image at various distances for different screen dimensions. An inverting switch, when activated, causes the luminous image appearing on the cathode ray screen to invert and to be reversed whereby the image projected on the remote screen is properly erected.

8 Claims, 6 Drawing Figures

CONVERTIBLE DIRECT VIEWING/PROJECTION T-V SYSTEM

BACKGROUND OF INVENTION

This invention relates generally to television viewing systems, and more particularly to a convertible system wherein the luminescent image produced on the screen of a cathode ray television tube may be viewed directly or in an enlarged scale on a remote screen.

In order to produce an image on the screen which is seemingly life-size, the dimensions of the screen whether for motion-picture or T-V presentation, must be properly related to the scope of the viewing area. In general, the larger the viewing area, the greater are the screen dimensions necessary to create a realistic picture. Thus, in a large motion picture theatre having hundreds of seats, it is customary to use a giant size screen occupying almost the entire frontal area of the theatre. When an observer in a theatre of this type is seated two or three hundred feet from the screen, a human figure displayed on the screen will seem to have realistic proportions only if the image thereof is several times its normal scale.

On the other hand, should the screen be placed in a living room for a home movie presentation, the screen in this instance need be no greater than that necessary to produce images approaching the normal scale, for a viewer is then but a few feet from the screen. Thus for home movie purposes a screen whose dimensions are 2.5 by 3.3 feet will afford images in an acceptable scale and the picture will be presentable if the image brightness is about three foot lamberts. But to see a good picture at this light level, it must be viewed in near darkness.

Where a proper visual relationship does not exist because the screen is oversize or too small with respect to the viewing area, the resultant images, as seen by the viewer, appear to be incongruous and violate his sense of scale. Moreover, an improper relationship between screen size and the viewer's distance therefrom is psychologically disturbing and gives rise to visual fatigue.

This imbalance is sometimes experienced in a crowded motion picture theatre when a viewer having normal vision is forced to sit very close to the screen, in which instance the images thereon appear unduly magnified, or when the viewer has no choice but to occupy a seat at the extreme rear, in which event the images take on a miniature or remote quality. In either case, the viewing experience is uncomfortable and the viewer's enjoyment of the screen presentation is impaired.

This imbalance between screen size and the viewer's position relative to the screen is particularly acute in home T-V presentations in which a luminous image is formed on the phosphorescent screen of a relatively small cathode ray tube. Most homes in the United States have T-V sets with a 17 inch screen (as measured diagonally). Sets with 23 and 25 inch screens are also available. And while these sizes represent a marked improvement over the 9 to 12 inch screens that were prevalent in the early days of television, the currently available TV screen range still falls far short of the dimensions necessary for optimum viewing comfort and enjoyment.

Larger cathode ray tubes dictate more commodious cabinets or consoles and entail higher-powered electronic circuits capable of driving the tube. Practical considerations impose strict constraints on the maximum size of a T-V tube that is feasible for home use. It is unlikely that tube sizes can be expanded beyond their present limits. This fact has been recognized for many years and it is for this reason that attempts have been made to employ optical projection systems in conjunction with T-V viewers in order to cast an enlarged image on a home screen of suitable size.

One of the earliest attempts in this direction, is disclosed in the 1950 U.S. Pat. No. 2,509,508, makes use of a combination of lenses and mirrors in conjunction with a cathode ray tube of small size but of augmented light intensity to project a cathode ray tube image onto a vertical screen.

Because of certain factors, it has not heretofore been possible to provide a projection television system whose cost would not be prohibitive for the average T-V set owner. Thus where the cost of a typical color T-V set is usually less than $400, the cost of a projection T-V system is currently well over $2,000.

One factor which accounts for the high cost of existing types of T-V projection systems is light intensity. A standard T-V set having a relatively small screen has sufficient light intensity to make viewing possible in a room having a fairly high level of ambient light. But should the image on the small T-V screen be projected onto a remote screen by a conventional optical system, the light losses encountered in optical projection are such as to produce an unacceptably dim image on the screen, even in near darkness.

It therefore becomes necessary to provide special electronic circuits operating in conjunction with a high-intensity cathode-ray tube, to step up the brightness on the screen beyond its normal level to compensate for these optical losses. Thus, the conventional T-V set cannot be used in conjunction with the projector, and since special circuits and tubes are necessary, this adds substantially to the cost of the system.

Another approach which has recently been taken is to produce a bright 6-foot-wide color picture which is 12 times the size of the biggest (25 inch) direct view T-V set presently being made. However, this approach requires that the conventional color T-V be abandoned in favor of three special projection tubes, one for each primary color. The three color images are projected separately onto the screen where they combine for the full color image. The cost of the arrangement is, for obvious reasons, much greater than that of a standard T-V receiver.

Another factor which precludes the use of a simple, inexpensive optical system for T-V projection is image reversal, for when an ordinary lens is placed before a T-V cathode ray screen for direct projection, the system forms an inverted image which is seen on the remote screen upside down and reversed from left to right.

It is known in optics to use an erecting system to reinvert the image produced by the lens to its proper orientation. This erecting system may be a lens or a prism arrangement, such as the "Porro" system consisting of two right angle prisms oriented at 90° to each other, the first prism reversing the image from top to bottom and the second prism from left to right. But erecting systems complicate the projection lens assembly and add substantially to the cost thereof. Moreover, erecting systems introduce further light losses.

SUMMARY OF INVENTION

In view of the foregoing, it is the main object of this invention to provide a converter which is readily attachable to a standard T-V set, whereby the set, in the absence of the converter, functions in its usual manner for direct viewing on a cathode ray screen, and in the presence of the converter, functions to provide a properly oriented bright image in an enlarged scale on a remote screen.

More specifically, it is an object of this invention to provide a converter of the above type which is constituted by a simple and efficient direct-throw optical projection system functioning in conjunction with an inverting switch which, when the optical system is operative, acts to invert the image on the cathode ray screen and to reverse it left to right, whereby the image on the remote screen is then properly oriented.

Yet another object of the invention is to provide a converter of the above type, in which the optical projection system is adapted to compensate for the curvature of the cathode-ray tube face, whereby the image projected on the remote screen is substantially free of distortion and properly focused throughout the entire field of view.

It is also an object of the invention to provide a low-cost converter of the above type in which the lenses of the optical system are fabricated of plastic material, whereby the system may be mass-produced without sacrificing optical quality. While the optical system may be composed of conventional convex and concave or plano-convex or plano-concave lens elements, the system also lends itself to the use of flat plastic Fresnel lenses having the desired optical characteristics.

Because a converter in accordance with the invention is capable of inexpensively transforming a living room or other small chamber having a standard T-V receiver into a video theatre, the converter brings new life to the home entertainment, education and commercial fields. Thus, T-V programs, such as sports events and movies and educational films which have limited effectiveness when seen on a small T-V screen may now be viewed in proper scale on a large screen.

Moreover, because optical projection is used, it now becomes possible to exhibit wide screen motion pictures in their intended manner. In wide screen cinema using standard size film frames, the images on the frames are optically compressed by means of anamorphic lenses, the images in projection being expanded to create a panoramic or wide screen presentation. When a wide screen film is presented on T-V, the film image must be cropped to conform to the standard T-V cathode-ray screen aspect ratio, so that the wide screen advantages are sacrificed. But with a projection T-V system operating in conjunction with a standard T-V receiver, the initially compressed wide screen images may be transmitted to the viewer without optical alteration and then optically expanded and magnified by suitable lenses incorporated in the projection lens assembly. This is particularly suitable for CATV systems wherein all T-V subscribers to the system may be equipped with a converter.

Briefly stated, these and other objects of the invention are realized in a converter consisting of an optical accessory which is attachable to a standard T-V receiver and an inverting switch which is connected to the vertical deflection circuit of the receiver.

The optical accessory is constituted by a housing which is readily attachable to the front face of the T-V receiver to mask the face of the tube and which contains a high speed objective that substantially covers the field of view, the objective including a field flattener lens fixedly positioned adjacent the outwardly curved face of the cathode ray tube and serving optically to flatten the curved field on the cathode-ray screen, and a movable lens barrel for projecting the flattened image field onto a remote screen, the lens barrel being axially shiftable relative to the field flattener lens for purposes of focusing the projected image. The inverting switch is connected in the vertical deflection coil circuit of the T-V set and, when actuated, causes the luminous image produced on the screen to invert and to be reversed whereby the image projected on the remote screen is properly erected.

OUTLINE OF THE DRAWINGS

For a better understanding of the invention as well as other objects and further features thereof, reference is made to the following detailed description to be read in conjunction with the accompanying drawings, wherein.

Figure 6:
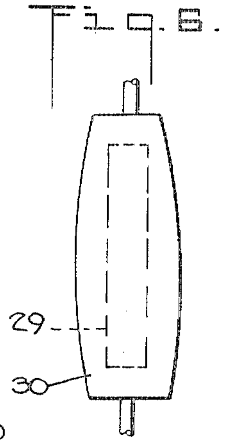
Figures 3, 4, 5:
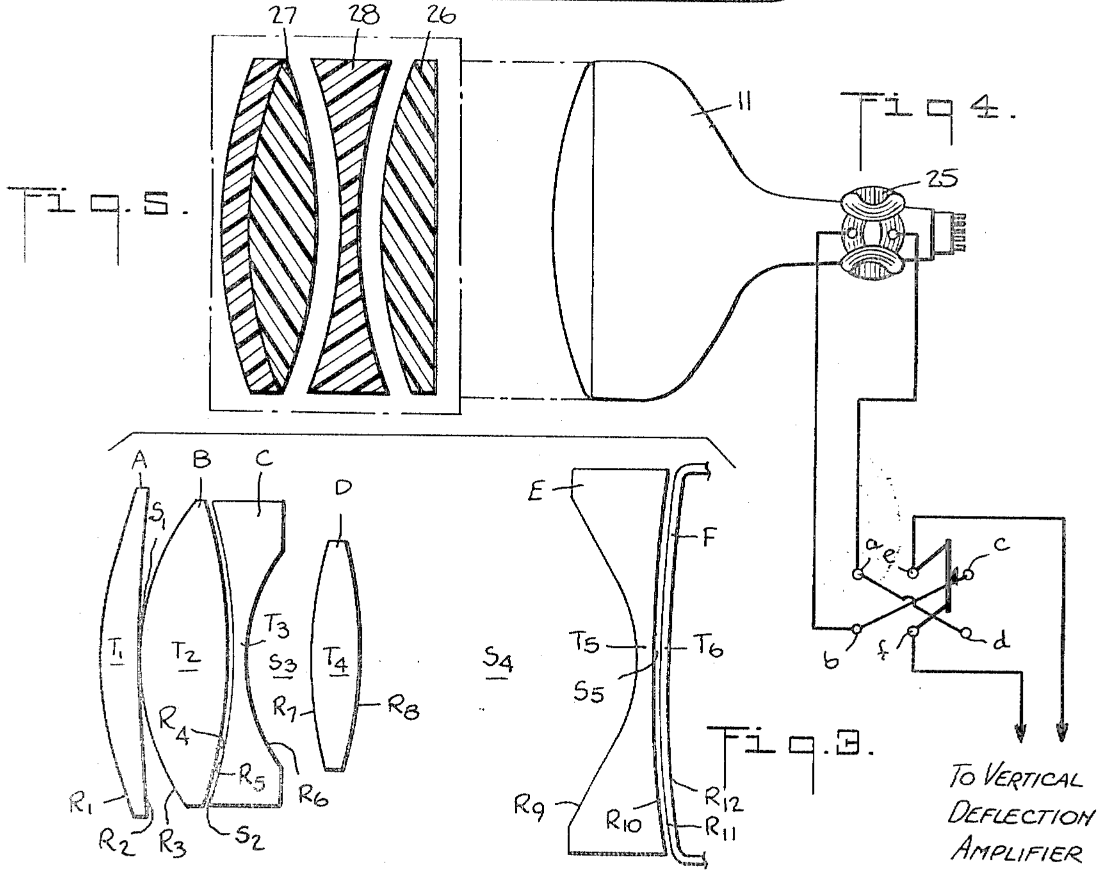

FIG. 3 schematically illustrates the lenses included in the accessory;

FIG. 4 shows the inverter switch connections to the T-V set;

FIG. 5 is another embodiment of an optical accessory in accordance with the invention; and FIG. 6 shows a preferred technique for forming plastic lenses.

DESCRIPTION OF INVENTION

Figure 1:
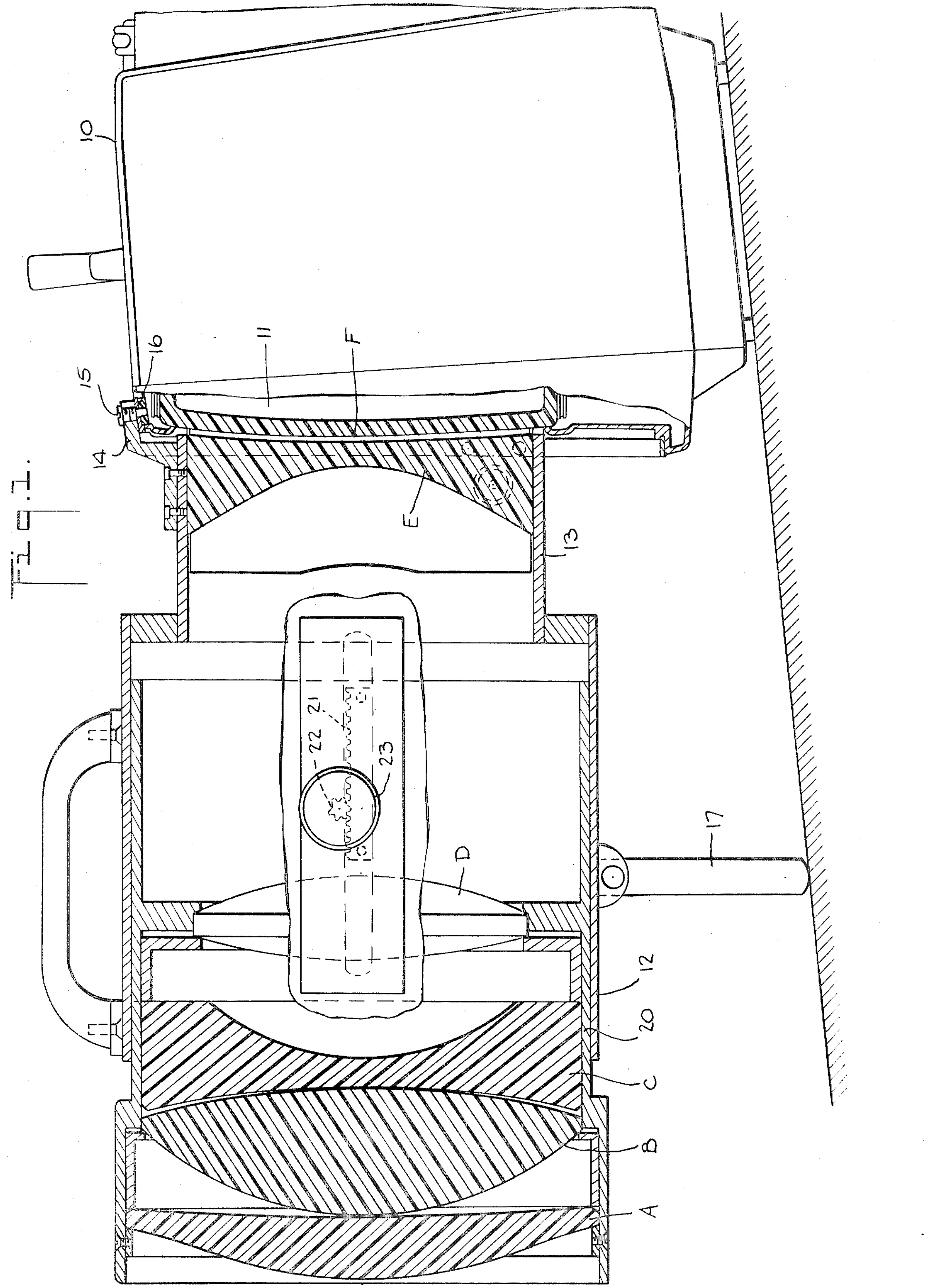
FIG. 1 is a longitudinal section taken through one preferred embodiment of an optical accessory in accordance with the invention, the accessory being attachable to a standard T-V set.
Figure 2:
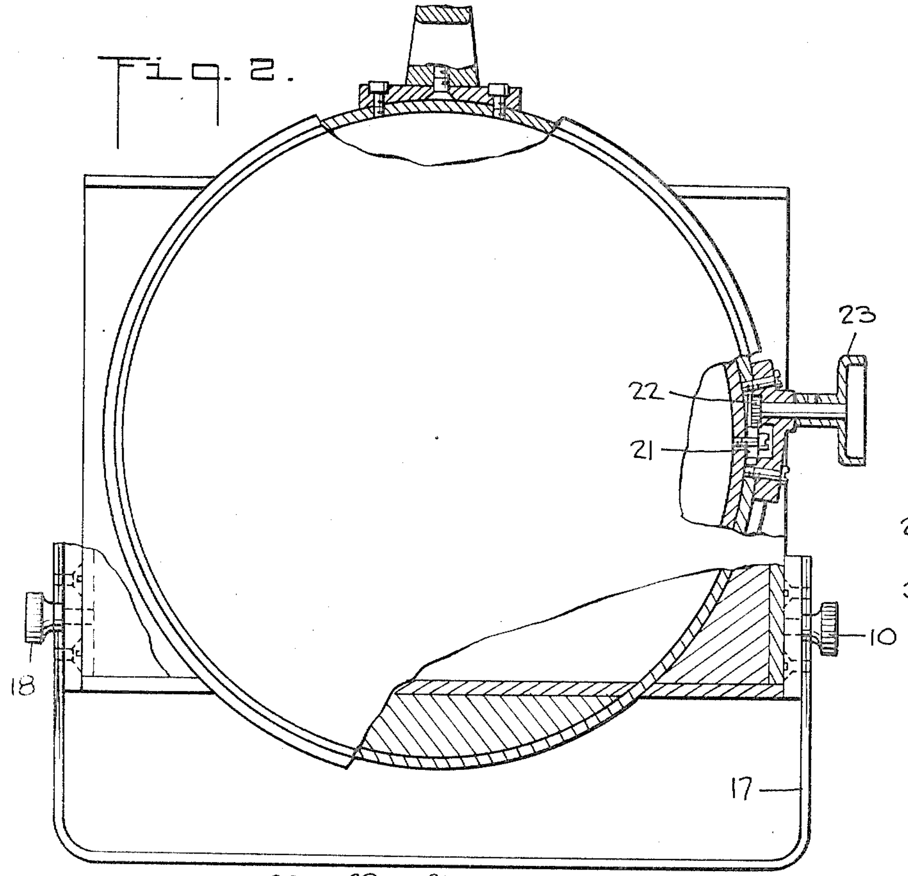
FIG. 2 is a front view of the accessory, partly in section.

Referring now to FIG. 1, there is shown a standard T-V receiver, generally designated by numeral 10, and provided with a cathode-ray display tube 11. In the conventional T-V system, a T-V camera tube employs an electron scanning beam to read off variations of signal amplitude corresponding to brightness from a photo-sensitive surface upon which a picture image is focused. This image is recreated by a cathode-ray display tube when a corresponding, synchronously modulated and deflected electron beam impinges on the rectangular raster area on the phosphorescent screen surface of the tube. Because the beam originates from a point source, in order to avoid distortion it is essential that the face of the tube be outwardly curved so that the beam traces an arcuate path.

Hence when the cathode ray tube is directly viewed, the luminous image is seen on an outwardly curved surface, but since the curvation is gentle, this is not disturbing to the viewer. But when the curved field is optically enlarged onto a flat viewing screen, the curvature becomes more pronounced and is disturbing to the viewer, unless corrected.

A converter in accordance with the invention includes an optical accessory which is attachable to the front face of the T-V receiver and is provided with a housing having a cylindrical front section 12 which is joined to a rectangular rear section 13. Rear section 13 is dimensioned to mask the transparent front face F of the cathode-ray tube 11 so that all light emitted therefrom is confined to the accessory when the accessory is attached to the set.

For purposes of ready attachment and removal, the rear section 13 is provided with a top bracket 14 having a retractable pin 15 which is adapted to enter a socket 16 installed at the center of the top wall of the T-V receiver cabinet. The front section is provided with a U-shaped or telescoping stand 17 which is pivoted thereto so that the stand may be angled to rest on a supporting surface and the set and accessory may be inclined to shoot an image at a desired angle. The stand position is maintained by knob-operated set-screws 18 and 19. In practice, side screws (not shown) may also be provided to anchor the accessory more firmly onto the T-V set. The invention, however, is not limited to any one means for coupling the optical accessory to the set.

The optical objective is constituted by five lens elements A, B, C, D, and E, in the order listed from front to rear. Lens elements A, B, C and D form a lens assembly that is mounted at spaced positions within a barrel 20 which telescopes within front section 12 and is axially slidable therein to effect focusing.

The axial position of the lens assembly is adjusted by means of a rack 21 secured to the side of the barrel and extending longitudinally. Rack 21 is engaged by a pinion 22 operated by an external control knob 23. Thus by turning the knob the barrel moves in or out, depending on the direction of rotation. In this way the image projected onto a remote screen may be focused for different distances and screen dimensions. This feature is useful, for in some instances the T-V set may be placed in a small room, in which case the projection throw is necessarily short and in other instances, the available space for a larger screen may be much greater.

Lens A is the first lens element, and it has a convex front surface with a vertex radius of curvature of $R_1$ and a concave rear surface with a radius of curvature of $R_2$. The axial thickness of the first lens element is $T_1$. The axial air space between the first lens element and the second lens element is $S_1$.

Lens B is the second lens element, and it has a convex front surface with a radius of curvature of $R_3$ and a convex rear surface with a radius of curvature of $R_4$. The axial thickness of the second lens element is $T_2$. The axial space between the second and third lens elements is $S_2$.

Lens C is the third lens element and it has a concave front surface with a radius of curvature of $R_5$ and a concave rear surface with a vertex radius of curvature of $R_6$. The axial thickness of the third lens element is $T_3$. The axial air space between the third lens element and the fourth lens element is $S_3$.

Lens D is the fourth lens element, and it has a convext front surface with a radius of curvature of $R_7$ and a convex rear surface with a radius of curvature of $R_8$. The axial thickness of the fourth lens element is $T_4$. The axial air space between the fourth lens element and the fifth lens element is $S_4$.

Lens E, which is fixedly supported in the rear section 13 against the face F of the cathode ray tube, is the fifth lens element and it has a concave front surface with a vertex radius of curvature of $R_9$ and a concave radius of curvature of $R_{10}$. The axial thickness of the fifth element is $T_5$ and the axial air space between the fifth lens element and the front surface of the cathode ray tube front face is $S_5$.

Element F is the front transparent face of a cathode ray tube which is not part of the invention, but the particular embodiment of the invention has its image field curvature adjusted to fit the rear surface of said front transparent face. Element F has a convex front surface with a radius of curvature of $R_{11}$, and a concave rear surface with a radius of cof $R_{12}$.

The front surface of lens element A, the rear surface of element C and the front surface of lens element E have aspheric surfaces, and the data for formulation of the said aspheric surfaces is included in the data table for the lens shown below.

By way of example, the numerical data of a preferred embodiment of the invention are stated in the following table. The numerical data are stated with reference to a mean focal length of F = 10.0.

The first column of the table indicates the lens means A to E and tube face F. The second column states numerical values for the radii of curvatures $R_1$ to $R_{12}$. The third column states numerical values for the axial separation of the surfaces. The fourth column contains the numerical values for the indexes $N_D$ of refraction of materials used for the lenses for the D line of the spectrum. The fifth column states the numerical values of the Abbe dispersion numbers $V_D$.

The aperture ratio of the objective is 1:1.5 and the back focal length is substantially zero as the image is located at the rear surface of the transparent face of the cathode ray tube or the like.

| | R | SPACES | $N_D$ | $V_D$ |
|---|---|---|---|---|
| | $R_1$=8.741 | | | |
| A | | $T_1$=1.089 | 1.489 | 54.3 |
| | $R_2$=50.81 | | | |
| | | $S_1$=.01 | | |
| | $R_3$=6.204 | | | |
| B | | $T_2$=2.468 | 1.489 | 54.3 |
| | $R_4$=−16.34 | | | |
| | | $S_2$=.001 | | |
| | $R_5$=−17.75 | | | |
| C | | $T_3$=.529 | 1.5917 | 30.8 |
| | $R_6$=4.491 | | | |
| | | $S_3$=1.849 | | |
| | $R_7$=12.90 | | | |
| D | | $T_4$=1.458 | 1.489 | 54.3 |
| | $R_8$=−8.03 | | | |
| | | $S_4$=7.724 | | |
| | $R_9$=−3.141 | | | |
| E | | $T_5$=.5 | 1.489 | 54.3 |
| | $R_{10}$=40.1 | $S_5$=.1 | | |
| | $R_{11}$=40. | | | |
| F | | $T_6$=.3 | 1.507 | 46.9 |
| | $R_{12}$=32.3 | | | |

Space $S_4$ is a variable space between the axially shiftable lens assembly A, B, C and D and fixed lens E to focus the lens assembly for various distances to the left-hand image (or object) position. As given, the lens is focused for approximately a 180 unit distance to the first image (or object) and a magnification of −0.125.

$R_1$ $R_6$ and $R_9$ are vertex radii of curvature, as these three surfaces are aspheric, and the radius of curvature varies for different parts of the surface.

The shapes of these three surfaces are defined by the formula:

$$Z = (C \cdot Y^2/1 + \sqrt{1-(K+1) \cdot C^2 \cdot Y^2}) + dY^4+eY^6+fY^8+gY^{10}$$

The numerical values for insertion into the above formula for calculating values of Z for each value of Y are found in the following tables for each of the lens surfaces, 1, 6 and 9.

| | Surface 1 | Surface 6 | Surface 9 |
|---|---|---|---|
| c | .1144 | .22268 | $-.31835$ |
| K | $-.57011$ | $-.12298 \times 10^{-1}$ | $-.15979 \times 10$ |
| d | $-.39510 \times 10^{-3}$ | $-.41923 \times 10^{-3}$ | $.31413 \times 10^{-2}$ |
| e | $-.56167 \times 10^{-5}$ | $-.16911 \times 10^{-4}$ | $-.67540 \times 10^{-4}$ |
| f | $-.17766 \times 10^{-6}$ | $-.34771 \times 10^{-5}$ | $-.24771 \times 10^{-5}$ |
| g | $-.19389 \times 10^{-7}$ | $-.19956 \times 10^{-7}$ | $.10339 \times 10^{-6}$ |

It has been found that an objective lens according to the above tables has good contrast and high resolution over its entire field of view of ± 20°. The objective lens is corrected for all optical errors over the entire field of view of ± 20°, and it is evident that objective lenses which do not have exactly the same numerical data as stated in the above tables will be sufficiently corrected to obtain the high quality of the objective lens according to the invention, and still lie within the scope of the present invention.

Lens elements A, B, C, D and E are made of a plastic material having suitable optical properties, such as transparent acrylic or polystyrene. Among the advantages of optical plastic over glass are light weight, low cost and a high order of light permeability. For example, in one actual embodiment, the focal length of the objective is substantially 10 inches. A glass objective of this focal length would be so thick that the light transmission would be low due to the higher absorption of glass.

Three of the lens surfaces are aspheric in order to obtain the speed required (at least $f$ : 1.5) in this objective. These surfaces are numbered 1, 6 and 9. The lenses may be molded or cast in final form for use. The objective has a substantial field of view (at least ± 20°. Lenses A and B have a positive power of refraction, lens C has a negative power of refraction, lens D has a positive power of refraction and lens E has a negative power of refraction.

Referring now to FIG. 4, there is shown the second component of the converter, namely inverter switch 24 which is a double-pole double-throw switch having two pairs of fixed contacts *a–b* and *c–d*, and having one pair of movable contacts *e–f*. The switch is interposed in the vertical deflection circuit of cathode ray tube 11 which includes a vertical deflection yoke 25. Movable contacts *e–f* are connected to the vertical deflection amplifier of the set which in the absence of the switch is ordinarily connected to the vertical deflection yoke.

The yoke is connected to fixed contact pair *a–b* which is cross-connected to fixed contact pair *c–d*. Thus when movable contacts *e–f* engage fixed contacts *a–b*, the vertical deflection amplifier is connected to the yoke in the usual manner, but when the movable contacts engage fixed contacts *c–d*, the connections are reversed.

Thus the switch when engaging contacts *c–d* acts to invert the T-V raster causing the image on the tube to be inverted and reversed left to right. With the image inverted and reversed left to right in this manner, no need exists to provide erecting elements in the optical accessory and direct projection becomes possible, with the resultant image on the remote screen properly oriented.

When the accessory is detached from the T-V set, the inverting switch is manually positioned on fixed contacts *a–b* for normal direct viewing of the cathode ray screen, but when the accessory is in place, the switch is positioned on fixed contacts *c–d* for viewing on the remote screen. In practice the switch may be provided with a projecting actuator pin which is engaged when the accessory is mounted in place and disengaged when the accessory is removed to provide an automatic switching action. All that need be done to install the inverter switch in a standard T-V set is to cut the existing wires from the vertical deflection amplifier to the vertical deflection yoke and make the connections shown in FIG. 4. This does not affect the set or picture tube adjustment in either black and white or color.

In the five lens objective shown in FIG. 1, the optical system is correct for chromatic or spherical aberration, coma, flare, astigmatism and other optical defects. It is also possible to obtain acceptable results with a very low cost three lens objective, as shown in FIG. 5, wherein lens 26 is the field flattener and lenses 27 and 28 form an assembly which is axially shiftable relative to the field flattener to focus a magnified image on a remote screen. The invention encompasses other lens combinations, such as two lens or six or seven lens systems.

Present lens injection molding techniques are limited to a maximum thickness of one inch, this limitation being imposed by striations and inhomogeneities created in the plastic in the course of the cooling cycle. Beyond a 1-inch thickness, the center of the molten plastic cannot cool as rapidly as the outer zones of the lens. Compression molding is presently the preferred method of fabricating thick lenses (i.e. –2½ inches), but with lenses no thicker than 1 inch, straight injection molding is satisfactory.

To overcome this drawback, one may, as shown in FIG. 6, introduce a solid planar optically shaped plastic block 29 of appropriate thickness in the injection mold 30, the block being centrally supported therein. This block serves as a core, the molten plastic being injected into the mold under high pressure to encapsulate the core. The core is of identical plastic material and becomes integrated with the injected plastic when the molten plastic cools and solidifies.

Because the molten plastic fills the outer zone of the lens, there is no differential cooling of the center and the outer zone and striations are not developed. Instead of a core piece, one may use a solid acrylic plate as one face of the mold an inject molten plastic into the space between the solid plate and the mold to create the desired lens formation.

Because of the projection arrangement, one may employ a highly compact T-V set having a relatively small tube such as a 10 or 12 inch size, so that the total cost of the system may e lower than that of a large size set.

It will be appreciated that the amount of light developed on the remote screen depends not only on the efficiency of the optical system but also on the intensity of light produced by cathode ray tube. While sets of good quality have adequate intensity for purposes of projection, one may also use a T-V set with a high intensity tube arrangement, so that the remote screen may be viewed with fairly high levels of ambient light. In practice, an increase in image intensity may be effected by raising the anode voltage on the cathode ray tube. The inverting switch may, for this purpose, be provided with additional contacts connected to the cathode ray tube power supply to effect an increase in anode voltage only when the inverting switch is in the position inverting the image on the cathode ray screen, the tube otherwise being returned to its normal intensity.

The invention is not limited to use with remote opaque screens and one may also use light permeable viewing screens. In the latter instance, a folding arrangement may be provided of the type presently used with slide projectors so that the screen may be collapsed when not in use. It is also to be noted that aluminized screens of the type currently available, such as the "Ektalite" screen, which have a slight spherical curvature, lend themselves for use with the instant optical projection system, for with such screens daylight or high ambient light viewing becomes possible even with the limited light brightness capacity of existing standard T-V sets.

While there have been shown and described preferred embodiments of a convertible direct viewing/projection T-V system in accordance with the invention, it will be appreciated that many changes and modifications may be made therein without, however, departing from the essential spirit thereof and defined in the annexed claims. For example, instead of operating the system in conjunction with a T-V set having a curved cathode-ray screen, in which event a field flattener lens is required, one may use a cathode-ray-tube having a flat face screen in conjunction with circuit nodules that correct for distortion arising from the use of a flat screen. With a flat cathode-ray tube screen, a field flattener lens is unnecessary.

We claim:

1. A converter for transforming a standard direct view television receiver into a video theatre, said receiver including a cathode ray display tube provided with a vertical deflection yoke and a vertical deflection amplifier for supplying a scanning voltage to said yoke, said converter comprising:

A. a demountable accessory enclosed in a housing attachable to the front face of the receiver to mask the face of the tube, said accessory including an objective that substantially covers the field of view to project an enlarged image onto a remote screen whose effective area is several times larger than that of the tube, said objective having lens elements optically forming an inverted image, and B. an image inverting switch interposable in the vertical deflection circuit of said receiver between said vertical deflection yoke and said vertical deflection amplifier thereof, said switch in one position supplying said scanning voltage to said yoke in the same polarity as in the absence of said switch to provide a normal image on said cathode ray tube for direct viewing, said switch in a second position reversing the polarity of said scanning voltage to provide an image on said tube which is upside down and reversed from left to right whereby as a result of the optical inversion introduced by said objective, the image on said screen is properly erected.

2. A converter as set forth in claim 1, wherein said remote screen is aluminized and has a slight concavity to optimize screen brightness in high ambient light conditions.

3. A converter as set forth in claim 1, wherein said objective is a high-speed objective whose *f*-number is at least about *f*: 1.5 and having a substantial field of view.

4. A converter as set forth in claim 1, wherein said inverter switch is a double-pole, double-throw switch.

5. A converter as set forth in claim 1, wherein the face of said cathode ray tube produces an outwardly curved field and said objective includes a field flattener lens fixedly disposed at the rear end of said housing and adjacent said face, said field flattener lens being adapted optically to correct for the curved field, said objective including a lens assembly which is axially shiftable within said housing relative to said field flattener lens to focus the image onto said screen.

6. A converter as set forth in claim 5, wherein said lens assembly includes an anamorphic lens to provide a wide screen presentation.

7. A converter as set forth in claim 5, wherein said objective is constituted by lens elements fabricated of plastic material having optical properties and a light permeability which exceeds that of glass.

8. A projection television system comprising:

A. a television receiver including a cathode-ray display tube having a vertical deflection yoke and a vertical deflection amplifier for supplying a scanning current to said yoke to produce an image on said tube which is upside down and reversed from left to right, and B. an optical accessory attached to the front face of the receiver to mask the face of the tube, said accessory including an objective that substantially covers the field of view to project an enlarged image onto a remote screen whose effective area is several times larger than that of the tube, said objective having optical elements forming an inverted image whereby as a result of the optical inversion introduced by said objective, the image on said screen is properly erected, said objective having a high-speed whose *f*-number is at least about *f*: 1.5 and being formed of a plastic material whose light permeability exceeds that of glass.

* * * * *

UNITED STATES PATENT OFFICE
CERTIFICATE OF CORRECTION

Patent No. 3,800,085 Dated March 26, 1974

Inventor(s) Maris Ambats, Thomas D. Shannon and Walter Joseph DeMaria

It is certified that error appears in the above-identified patent and that said Letters Patent are hereby corrected as shown below:

Col. 6, line 10 "cof" should have read -- curvature of --

Col. 7, line 48 "connected to the" should have read -- connected directly to the --

Col. 8, line 15 "comect" should have read -- corrected --

Col. 8, line 48 "an" should have read -- and --

Col. 8, line 55 "may e" should have read -- may be --

Signed and sealed this 2nd day of July 1974.

(SEAL)
Attest:

EDWARD M. FLETCHER, JR.
Attesting Officer

C. MARSHALL DANN
Commissioner of Patents